Oct. 3, 1967 E. W. ROEDDER 3,344,669
DEVICE FOR SENSING THERMAL GRADIENTS
Filed Aug. 23, 1963 3 Sheets-Sheet 1

INVENTOR
EDWIN W. ROEDDER

BY
ATTORNEYS

Oct. 3, 1967 E. W. ROEDDER 3,344,669
DEVICE FOR SENSING THERMAL GRADIENTS
Filed Aug. 23, 1963 3 Sheets-Sheet 3

INVENTOR
EDWIN W. ROEDDER
BY
Ernest S. Cohen
Gersten Sadowsky
ATTORNEYS

United States Patent Office 3,344,669
Patented Oct. 3, 1967

3,344,669
DEVICE FOR SENSING THERMAL GRADIENTS
Edwin W. Roedder, Bethesda, Md., assignor to the United States of America as represented by the Secretary of the Interior
Filed Aug. 23, 1963, Ser. No. 304,285
6 Claims. (Cl. 73—339)

This invention herein described and claimed may be manufactured and used by or for the Government of the United States of America for governmental purposes without the payment of royalties thereon or therefor.

This invention concerns heat sensing instruments which are operative to indicate and measure relevant characteristics of thermal gradients, and heat sensitive control devices adapted to function in response to variations in such characteristics of thermal gradients. Unlike temperatures at spaced apart points in a substance give rise to a thermal gradient whose representation as a vector is derived from the temperature difference which defines a magnitude therefor, and the path of the heat flow between the points of higher and lower temperatures manifesting its direction. Therefore, instrumentation according to the invention is advantageously applicable to heat conditioned environments for obtaining an accurate analysis of significant heating effects therein, since it would facilitate a rapid identification of the disposition and distribution of the relative heat intensities or temperature in such environments. When devices according to the invention are applied to exercise control, they function positively and efficiently to direct the functions of mechanisms adapted to be operatively responsive to a wide variation in heating conditions.

A structural component basic to all forms of the invention comprises a sealed enclosure containing a liquid having occluded therein a gaseous element capable of manifesting the existence and direction of a thermal gradient. A phenomenon of nature which predisposes this capability is evidenced by an effect in which the gaseous occlusion darts through the liquid medium defining it, toward or away from a point of higher temperature when the sealed enclosure is situated in the path of a thermal gradient. Although not completely established, it has become evident from many experiments performed that this phenomenon follows from the relative thermal molecular impacts on the hotter and colder interfaces defining the gaseous occlusion. These forces are known to be temperature- and composition-dependent, but in a rather complex manner. It appears that the thermal expansion of the liquid in response to temperature rise results in a change in the net force exerted which acts in one or another direction to oppose the forces normally present on the aforesaid interfaces. Even though a proper selection of the particular liquid for use in the sealed enclosure would evidently allow the making of instruments according to the present invention which could have occlusions that move either toward or away from the higher temperature when placed in the path of a thermal gradient, for the purposes of the description herein reference is made to only liquids whose occlusions move toward the higher temperature. Ideally, the volume of liquid is enclosed by a thin-walled vessel such that thermal equilibrium with the surrounding environment will be rapidly established. Moreover, such enclosures are appropriately shaped to allow a suitable effective component of the force created by the temperature differential to move the occlusion against the normal buoyancy induced by gravity. The ostensible effects of gravity may be eliminated through the use of a horizontal upper confining wall for the enclosing vessel. However, general applications of the invention for control purposes, require that the effects of gravity be utilized to predetermine the sensitivity of responsiveness of the instrument or device made according to the invention.

As hereinabove indicated, the effect of gravity may be utilized as a constant control force, which is countered by the thermal gradient effect to provide a determinable force for operating the invention. To endow any particular form of the invention with a thermal gradient threshold and a range of sensitivity, consideration is given to a number of factors effectively constituting the basic parameters for the relationships upon which are founded the operational characteristics of such embodiment. Among such factors are the density of the liquid contained therein and the size of its gaseous occlusion. It is evident that a denser liquid or a larger occlusion would require the existence of a temperature differential providing a greater force for displacing the occlusion counter to the effects of gravity. Increasing the angular disposition of the channel in the enclosure constituting the confining path provided for the mobile occlusion, in respect to the horizontal, also makes necessary a greater thermally created force. Naturally, the pertinent effective component of the gravitational force, that is the one directed along the path of the occlusion's displacement, increases from a mere frictional force at a horizontal disposition to a maximum at a vertical one. Further, once the occlusion is started toward a displacement along a path situated at a uniform angular disposition, in response to a continuing thermal gradient equal to or greater than a given threshold, the effective gravitational force will maintain an unchanging resistance to the occlusion's movement which continues unchecked until prevented by the end wall of the enclosure upon which it eventually becomes lodged. On the other hand, a path defined by a gradually changing angular disposition in respect to the horizontal, such as one substantially following an arc, will present a graduated effective gravitational force for resisting the movement of the occlusion occasioned by the thermal gradient force. Consequently, an instrument according to the invention, comprising a vessel formed to provide a gradually changing angle for the path along which the occlusion is confined to travel, may be furnished with suitable calibrations to indicate the relative or particular intensity of a thermal gradient. In addition, it is equally practicable to shape the enclosure vessel such that its plan view appears as a disk whereby the direction in which the occlusion moves along a horizontal radius thereof can be observed to aid in a direct determination of the direction along which the thermal gradient lies.

In the past, thermal gradients were detected, indicated and controlled by means of instruments using pairs of individual thermal sensors. These instruments generally comprised current generating differential thermocouples as their sensing structure. Nevertheless, instruments of this type are mainly useful for detecting and measuring small temperature differences between two more or less static environments. Examples of instrumentation fashioned in this manner are disclosed in Patent No. 2,964,946, issued Dec. 20, 1960, to Gilfillan, Jr., and Patent No. 3,024,657, issued Mar. 13, 1962, to Brown. Reference to these patents makes evident that such instruments comprise relatively complex structural arrangements. However, the heat responsive components disclosed herein for the present invention will be found to have structures that are inherently simple, but which are also compact and rugged, making them highly effective for use in test and control equipment for a wide range of industrial and research activities.

An object of the present invention is therefore to provide highly sensitive instruments for detecting the existence of thermal gradients.

Another object of the invention is to provide devices made operatively responsive to forces engendered therein by heat along the path of a thermal gradient, to effect indications and control in accordance with the existence, magnitude and direction of the thermal gradient.

In order that the invention may be more clearly understood reference will now be made to the accompanying drawing which shows by way of example preferred embodiments thereof.

Figure 1:
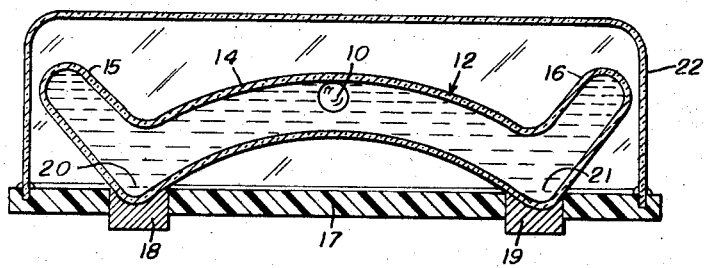
FIG. 1 is a partial sectional view of an elementary form of a thermal gradient detecting and measuring instrument according to the invention.

The instrument of FIG. 1 is best suited for detecting the existence of thermal gradients in a surface over which the instrument is manually manipulated until an indicating occlusion therein comprising the bubble 10, appears to move from its central location in an enclosure 12. Selectively discrete movements of the instrument in different directions about the point at which bubble activity is indicated, will in a short time reveal the path of the definitive thermal gradient of the area under investigation. Due to its simple and compact construction, the instrument can be conveniently applied as indicated. Enclosure 12 comprising thin-walled clear plastic or glass tubing, is upwardly arched to form a relatively wide central section 14, and further upwardly bent near each end of the central section to form short straight sections 15 and 16 extending at relatively steep angles from the central section. Among the various liquids which would be suitable to form the bubble 10 in the enclosure, are water, brines, oils, acetone alcohol, ether, and liquid carbon dioxide. The gas filling the bubble 10 may be a vapor phase of the liquid defining the bubble, or air.

In a housing for enclosure 12, comprising a rectangular base 17 of glass, plastic or some other similar heat insulator, provision is made by means of spaced apart openings in the base, to suitably fix in position thermally conductive cup-like inserts 18, 19, which receive elbow-like portions 20 and 21 of the enclosure. Portions of the individual inserts extending below base 17, act to more effectively transmit a representation of the heat sensed to a substantial surface area of the respective elbow portions. Over the parts assembled on base 17 is positioned a transparent cover cap 22 having its outer edge sealed within a track encircling the upper surface of the base. The space between cap 22 and base 17 may be evacuated to avoid stray heating effects from reaching the upper surfaces of the enclosure. Graduated marking may be inscribed on the enclosure or the cap to facilitate rapid analysis of the data produced by operation of the instrument.

Because of the arcuate path in which bubble 10 must move to pass through the arched central section 14 of the enclosure shown in FIG. 1, the difference in temperatures present at the areas sensed by the enclosure's elbow 20 and elbow 21, must gradually increase to cause continued displacement of bubble 10 from the central point in the arch to one or the other of the elbows. However, upon reaching a low point within one of the elbows, bubble 10 will dart upwardly into the steep path defined by the adjacent inclined extension. In this manner the final position of the bubble is fixed at one end or the other of the instrument to indicate the existence of a significant thermal gradient, as well as the direction from which the heat is flowing since bubble 10 moves toward the greater heat source. Resetting the instrument for further use only requires that it be quickly up-ended and releveled whereby bubble 10 is restored to the upper part of section 14. Although the instrument of FIG. 1 is shown to have a generally horizontal disposition, it should be recognized that the enclosure of an instrument of this nature may also be set wholly vertically. This latter arrangement would be desirable in an instrument situated to extend through a horizontal partition or ceiling structure on whose opposite surfaces are present differing degrees of temperature. However, this form of the instrument would normally function only to detect and indicate a threshold value corresponding to the existence or the surpassing of a predetermined temperature differential across the aforesaid opposite surfaces.

Figure 2:
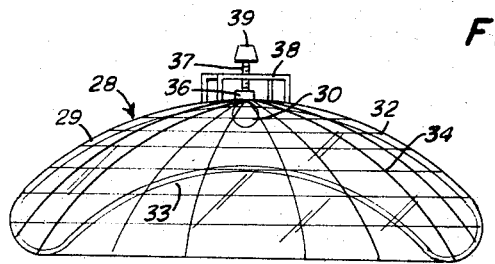
FIG. 2 is a partly schematic representation of another elementary form of the invention.

The generally circular form of the invention shown in FIG. 2, constitutes a thermal gradient sensor 28 which is usefully applicable in much the same way as is the structure shown in FIG. 1. Enclosure 29 of this sensor makes available a diverging concave-convex configuration of thin-walled plastic or glass, which allows immediate indications of the directional character of the predominant thermal gradient. Displacement of its bubble 30 from an upper central location, may be in any direction determined by the existing gradient, the bubble being limited only to follow an arcuate path as directed by the curvature of the enclosure's inner and outer walls 32 and 33 respectively. Stray heat effects may be avoided as explained previously, by mounting enclosure 29 in a sealed and evacuated container in the nature of that shown in FIG. 1 by elements 17 and 22. Nevertheless, the integral structure of enclosure 29 may by itself be applied as indicated. Inscriptions of circular and radial graduated indicia 34 on the enclosure's upper surface 32 are desirable particularly when close comparisons are to be made of a number of readings obtained in one particular area.

Figure 2A:
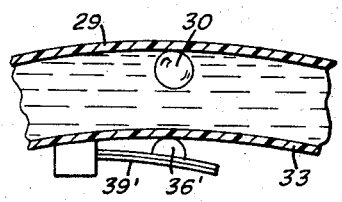
FIG. 2A is a fragmentary showing of a cross-sectional view illustrating a modification of structure shown in FIG. 2.

Temperature variations may critically disturb the sensitivity of thermal gradient sensors according to the present invention, because the resulting expansion or contraction of the liquid in its generally rigid enclosure would effectively decrease or increase the size of the indicating bubble. Since the sensors are applicable in environments where heat or temperature changes normally occur, it is desirable that sensors so applied have means to compensate for these possible thermal effects upon the density of the sensors' liquid and gas contents. A compensating means can be added to a sensor such as shown in FIG. 2 having a plastic enclosure 29, which comprises a hemispherical depressor 36 placed in contact with the uppermost surface of the outer wall 32. Displacemnet of depressor 36 is accomplished by turning a threaded rod at whose end it is attached, within a threaded sleeve 37 fixed above wall 32 by a rigid frame 38 cemented to the surface of the wall. A manually operable knob 39 secured to the outer end of the rod, may have an indicator pointer associated with a scale placed upon frame 38. Depressor 36 acting upon a flexible portion of the enclosure can be appropriately adjusted to vary the latter's total enclosed space to compensate for a given temperature range of operation. FIGURE 2A illustrates an automatic compensation means comprising a bimetallic strip 39', or similar thermal sensor which may be attached to a high point on the inner wall 33. A depressor 36' fixed to strip 39', contacts a flexible portion of wall 33, against which it is most effective when the strip is bent by reason of decreasing temperatures. Accordingly, the pressure to flex the wall 33 inwardly varies inversely with the gross or average temperatures within the area to which the sensor is applied. An enclosure made of other than a flexible material, may be provided with a suitably located flexible insert upon which the compensator depressor may act.

Figure 2B:
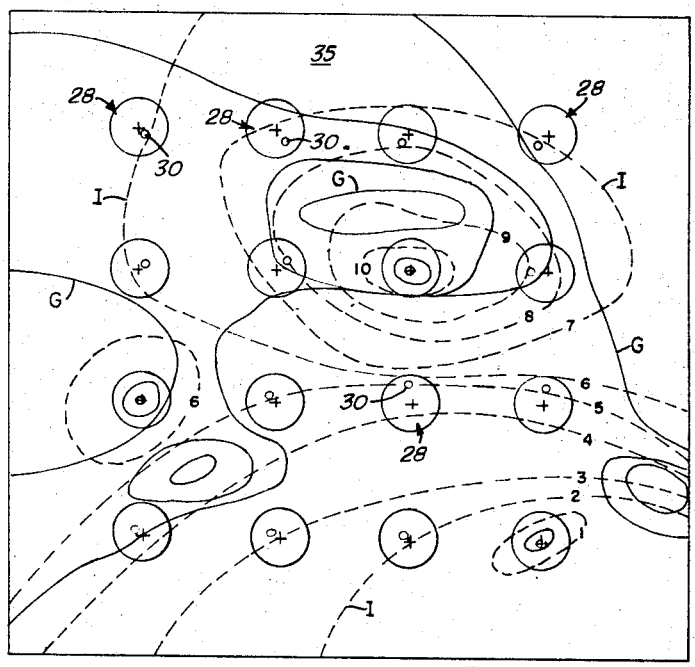
FIG. 2B is a graphical representation explaining a utility for the form of the invention according to FIG. 2.

A relatively large area can be exhaustively examined for thermal gradients by arranging on this area 35, a number of circular sensors 28 in an array as shown in FIG. 2B. General trends in the distribution of the thermal gradients over the entire area can be quickly established by a mere glance at the indications produced on the various sensors. To more clearly illustrate the significance of the information to be gained from the sensors 28, reference is made to the dashed lines I shown as contour lines over the area 35. The separate lines are intended to represent isotherms in that they constitute a locus of points on area 35 which for the purposes of this explanation, are assumed to be at the same temperature. Numerical designations are provided in these lines to correspond to the relative magnitudes of the temperature conditions the lines represent. As hereinbefore explained, the individual sensors 28, are operatively responsive to a difference in temperature, whereby the displacement of its bubble is proportional to the difference sensed. It should also be understood that closer spacing between adjacent dashed lines I, is evidence of a steeper slope between the isotherms, and consequently of a relatively greater thermal gradient which is to be effective upon the sensor. Note, for example, that the lower right sensor of the four shown in the central portion of area 35, is represented with its bubble 30 at an extreme displacement or greatest magnitude since it is in the field of the steepest slopes. Further, it is evident that the bubble position directionally indicates the path toward the higher temperatures. The sensor immediately above the one previously noted, residing within a plateau of substantially uniform temperature, can be seen to have its bubble nearly at the center point thereof, indicating the lack of any significant temperature differential in the immediate area. Similarly, the sensor at the lower right corner of FIG. 2B, has its bubble centrally oriented since this sensor is located within a valley of substantially uniform low temperature.

Also shown in FIG. 2B, are full line contours G, individually representing a locus of points of equal thermal gradient whose magnitude and location are derived from the data brought to light by application of the various sensors 28. As hereinbefore indicated, the bubble position of an activated sensor determines the characteristics of a vector defined by an imaginary arrow from the center of the sensor to the bubble, wherein the length of the arrow is indicative of the magnitude of the gradient (corresponding to the spacing of the related isotherms I), and its disposition being indicative of the direction of increasing temperature, or the reverse of the direction of heat flow. Since contours G connect points of equal magnitude read on the sensors, they in effect represent the first differential of a plot of the vector quantities. Manifestly, with a greater number of sensors applied over a particular area, there is obtained a more accurate representation of the relative heat distribution and flow. Derivation of more complete data may also be accomplished by a full coverage linear scanning over an area using a single small sensor of adequate range, from which continuous readings can be obtained.

Figure 3:
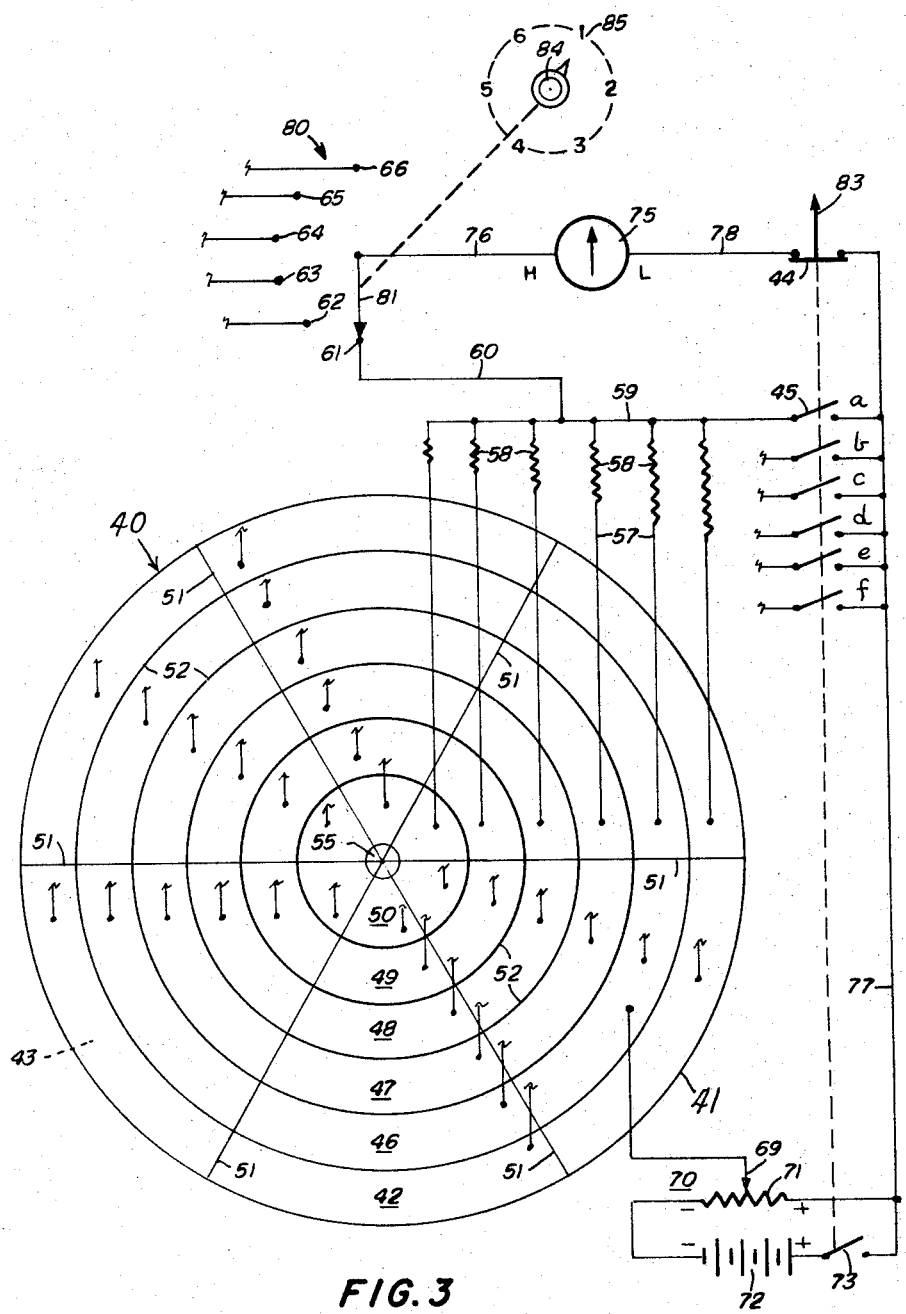
FIG. 3 is a partially diagrammatic and schematic illustration of yet another form of the invention showing in particular electrical circuitry for reading out data derived by operation of this form of the invention.

FIG. 3 illustrates an embodiment of the invention in which a sensor 40 comprises an enclosure 41 having a concave-convex configuration corresponding closely to that of enclosure 29 described for the sensor of FIG. 2. Otherwise, enclosure 41 differs significantly in that it is constructed from a multiplicity of thin, curved segments of aluminum or other electrically conductive material, and a dish-shaped disk of like material, which are held together by means of strips of electrical insulation material, to form by their assembly the aforesaid configuration. As seen in FIG. 3, enclosure 41 is formed by six arcuate segments 42, defining an outer peripheral portion to which are joined the dish-shaped disk forming a base 43, and further circular arrangements of arcuate elements comprising six each of segments 46, 47, 48, 49 and 50. Electrically isolating the various segments from each other and from the base, and providing gaskets for sealing the enclosure 41, are arcuate strips 51, and circular strips 52, made of insulating material such as rubber or plastic. In an alternative construction for enclosure 41, all conductive parts, including the segments and base, can be plated upon a thin walled glass enclosure such as shown in FIG. 2, by a cathodic sputtering process such as described in Patent No. 2,681,886, issued to Teal, on June 22, 1954. Electrical insulation between these conductive parts may be accomplished by suitably covering over a net of strip-like surfaces corresponding to the insulating areas on the enclosure, with non-conductive material before commencing the plating process, or by etching such strips after plating to circumscribe conductive plated areas that form the segments and base. As will be hereinafter more fully explained, these structural arrangents allow the enclosure 41 to function as a sealed container for confining a liquid dielectric containing a bubble, between electrically conductive surfaces which comprise the elements of a multiplicity of contiguous plate condensers.

To each of the conductive segments 42, 46, 47, 48, 49 and 50, is electrically connected a lead 57 having in circuit therewith, a resistance element 58. For the purposes of clarity, FIG. 3 shows extended leads 57 for one set of segmented parts such as would be situated between two arcuate insulator strips 51. The magnitudes of the particular resistances in the respective leads 57 for a set of segmented parts, vary by significant steps from a maximum in the lead to a segment 42, to a minimum in the lead to a segment 50. A circuit 59 joins these leads 57 in parallel to a further lead 60 terminating in an electrical contact 61 of a selector switch 80, and through a first contact $a$ of a multiple contact switch 45, and a lead 77, to a potentiometer circuit 70 described hereinbelow. In an obvious manner the six leads from each of the other five sets of segmented parts 42, 46, 47, 48, 49 and 50, are joined in separate parallel circuits which are respectively connected to contacts 62, 63, 64, 65 and 66 of the selector switch 80, and to contacts $b$ to $f$ of switch 45, which are operable like contact $a$, to complete parallel connections from these circuits to the aforesaid potentiometer circuit. Extending from an electrical connection on the base plate 43, is a lead 68 which terminates in a sliding contact element 69 of a potentiometer 70. Energization of the slidewire 71 of the potentiometer, is provided by a source 72 in a circuit including an on-off switch 73. A meter 75 such a centered galvanometer, is connected by a lead 76 to an adjustable contact arm 81 of the selector switch, and by lead 78 to a normally closed switch 44 completing a circuit via lead 77, from the meter to the potentiometer circuit 70.

Conductive segments 42, 46, 47, 48, 49 and 50, that are bounded between any two consecutive insulator strips 51, are as indicated previously, also electrically isolated from one another and base 43 by insulator strips 52, whereby they individually constitute one plate of a condenser component whose other plate is in that part of the surface comprising the enclosure's electrically conductive base 43, located opposite and substantially parallel to the aforesaid one plate. Since the size of the individual segments of these condenser components decreases from the periphery of the enclosure 41 towards the center thereof, their charging capacity progressively varies accordingly, from a maximum at the periphery of the enclosure to a minimum at its center. This becomes evident from a consideration of the relationship defining the capacity C of a condenser, $$C = \frac{kA}{4\pi s}$$

where $k$ is the dielectric constant determined by the particular dielectric material maintained between the plates, A is the effective conductive area, and $s$ is the distance between the plates. Distance $s$ is substantially the same for all the condenser components of enclosure 41, and the different effective areas thereof remain unchanged. Therefore, any change in the dielectric material between the plates of any particular condenser component would result in a change occurring in the capacity of such component. Taking advantage of this characteristic operation of the condenser components in accordance with the invention, makes available a unique mechanism for detecting and measuring thermal gradients. When provision is made to fill the enclosure 41 with pure water, whose constant $k$ is 81, having therein an air bubble with a constant $k$ of 1, it is apparent that when this bubble replaces water between the plates of any condenser component, the charging capacity thereof changes radically. Therefore, by locating the sensor 40 in the path of a thermal gradient, its air bubble 55 is caused to move from a central point toward the area of the greater heat in such manner that it becomes stationed between the plates of one or at most four of the thirty-six condenser components of the sensor. By activating the electrical circuitry shown in FIG. 3, the the condenser components so affected are subsequently detected, and in a manner hereinafter described, indicators are controlled in subsequent operations to provide magnitude and direction data for the thermal gradients under investigation.

Before the detection device comprising sensor 40 is operated to obtain data, it is necessary that it be suitably situated on a level area at the site of interest, and all condenser components be charged to capacity. Charging the condensers is initiated by depressing a gang switch control 83, which closes the multiple contacts of switch 45, and the contacts of switch 73, and opens the contacts of switch 44. Consequently, the input circuit to meter 75 is disabled, while a charging circuit for the thirty-six condenser components is completed to contact 69 of the energized potentiometer 70 through leads 68, 77, 59 and 57, and the multiple contacts of switch 45. Thereafter, a control knob 84 for the selector switch 80, is adjusted to locate contact arm 81 upon contact 61, and control 83 is returned to normal, opening the contacts of switches 45 and 73, and closing switch 44. Thus, a read-out circuit comprising leads 57, 60, 76, 77, 78 and 68, is conditioned for operation whereby the set of condenser components connected to contact 61, are permitted to discharge through the resistances 58, and the meter 75. Of the six condenser components connected in the read-out circuit, only one may have the displaced bubble 55 located between its plates, whereby it alone would have received a charge of any significance when connected to the potentiometer 70. Therefore, upon discharging the condensers only this one will cause a significant current to flow through the resistance 58 serially connected thereto. Since the different magnitudes of the resistance 58 can be appropriately predetermined to distinctly identify the particular condenser component associated therewith, the resultant reading on the meter 75 is indicative of the component having the bubble located between its plates. In this manner, the extent of the bubble's displacement from its central position is detectable, and hence the magnitude of the thermal gradient is determinable. It is obvious that the meter 75 may be calibrated to directly indicate a measure of the thermal gradient's magnitude. If by chance the bubble is partly positioned under each of two adjacent segments, the meter reading will merely reflect a summation of partial values which would provide a clearly distinguishable value in between the values predetermined for the condenser components comprising the adjacent segments.

In the event no significant meter reading is found when contact arm 81 is on contact 61, dial 84 is then further adjusted to complete circuits to contact 62 of the selector switch, and the meter is observed for magnitude data. However, failure to obtain any meaningful meter reading from this or succeeding adjustments of the contact arm 81, makes evident the lack of a significant thermal gradient at the site being examined. Moreover, the position of the adjusting dial 84 when a reading denoting bubble displacement is made apparent, can be read against a suitable scale 85 to indicate which of the six sets of condenser components provided this reading whereby data is obtained as to the approximate direction of the thermal gradient. Readings obtained at two adjacent positions on the dial 84 are merely added, and the significance thereof as to magnitude and direction, is interpreted accordingly.

Since the sensor 40, and the read-out circuits including the meter 75, are operatively linked only by electrical leads, it is evident that the sensor may be located at points remote from the meter and switching controls 83 and 84. Consequently, the sensor may be embedded in a wall or otherwise located at any inaccessible point in a structure.

Figure 4:
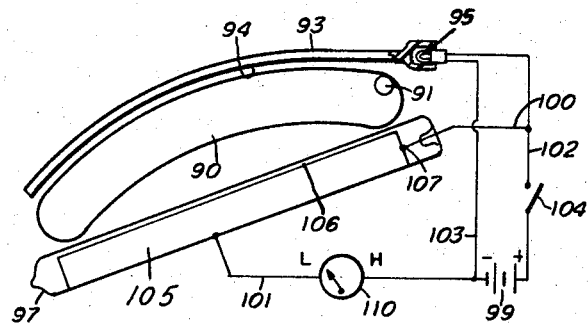
FIG. 4 is a schematic representation of a further embodiment of the invention including an electrically operated read-out structure therefor.

In the embodiment of the invention shown in FIG. 4, an enclosure 90 comprising an arcuate tubular structure, which confines a bubble 91 within its liquid contents, is adapted to cooperatively relate to a photocell detecting arrangement. Thin glass tubing or other transparent heat resistant material used in making enclosure 90, allows a beam of light to pass completely through the width of the enclosure. This light beam originates in a Lucite rod 93 situated above the enclosure and aligned therewith whereby it follows at close proximity thereto the full length of the enclosure's curvature. Light transmitting rod 93 is prepared for use in the arrangement by having a narrow section of its inner concave surface made into a flat strip 94 such that a thin sheet of light is allowed to project toward the enclosure 90 when power is supplied to a light source 95 enclosed within an enlarged end of the rod. Spaced closely below enclosure 90, and spanning the full length thereof, is a tubular photo electric cell 97. A conventional D-C source 99 furnishes power through two circuits connected in parallel, comprising leads 102 and 103 and leads 100, 101, 102, to activate the light source 95, and photocell 97, respectively. An on-off switch 104 also provided in lead 102, is operable as needed to complete the light and photocell circuits.

For a full disclosure of the theory and operation of the photo electric cell 97, attention is called to Patent No. 1,811,024, issued June 23, 1931, to R. K. Potter. As explained in Potter's patent, this type of photocell has arranged in an evacuated enveloped a photo sensitive cathode 105, which is supported upon the inside surface of the envelope to cover all but a small slit or window 106 thereof, and an anode 107 comprising a small sphere centrally mounted close to one end of the envelope. A cell made in this manner is operable to provide an output responsive to the displacement of an incident light beam of constant or varying intensity. An indicating galvanometer 110, provided in the circuit connecting the electrodes of the photocell, receives and indicates the magnitude of the photocell output.

Application of an instrument made as shown in FIG. 4, to the task of detecting and measuring thermal gradients existing in an area of interest, requires that the instrument be activated by closure of switch 104, whereupon a meter is observed for a deflection indicating displacement of the bubble 91. As is evident from a study of FIG. 4, only that portion of the light projected from surface 94 of the Lucite rod, which is aligned with the bubble 91, passes through the enclosure and reaches slit 106 of the photocell. A dye may be used to darken the liquid in the enclosure 90, to facilitate the masking function of such liquid. Any displacement of the bubble 91 toward the source of greater heat will therefore shift the location of the light passing through the enclosure, whereby the points on the cathode 105 becoming sensitized by the light, are made increasingly more remote from the anode 107. As a result the output from the cell continues to decrease as the effective light follows the bubble being displaced in accordance with an increased thermal gradient. Suitable calibrations inversely arrayed across a scale on meter 110, will adapt it to be read directly for the magnitude of the thermal gradient detected. As explained in connection with the embodiment of FIG. 3, the utilization of extended electrical connections between the photocell and the meter permits an instrument such as shown in FIG. 4 to be used at internal points, and at remote and otherwise inaccessible locations.

Figure 5:
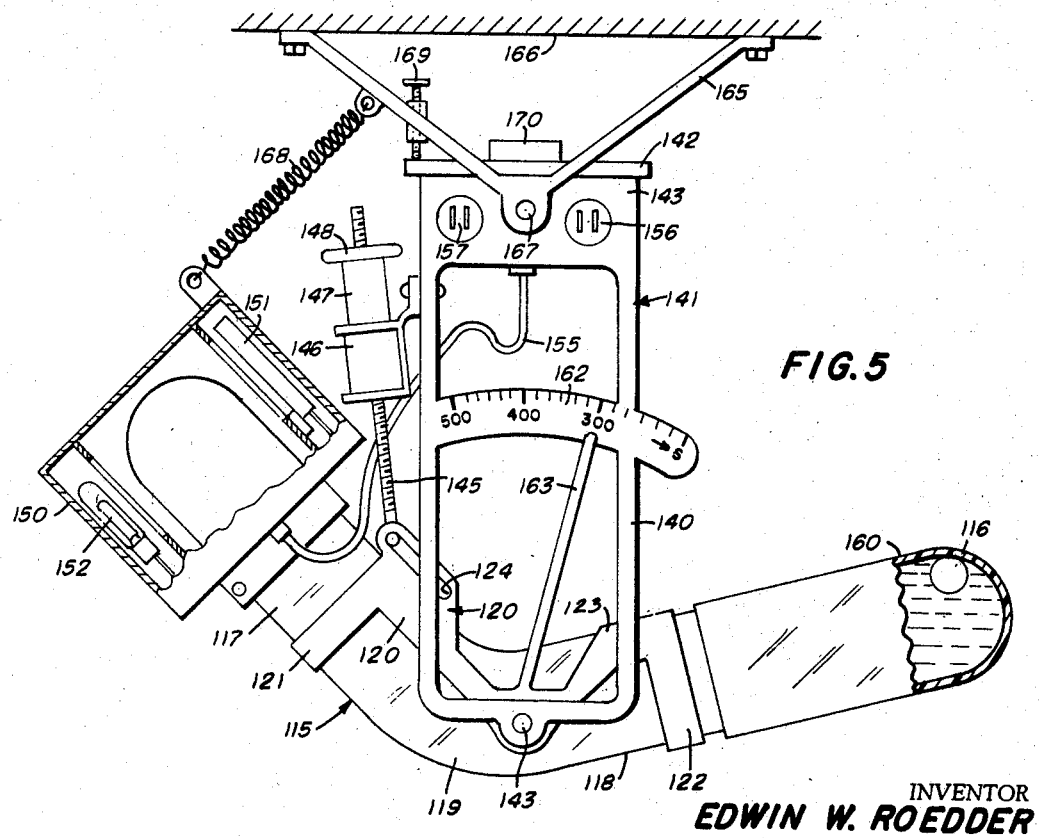
FIG. 5 is an elevational view, partly in section, of a device according to the invention operable as an alarm or control for heat regulated apparatus.

FIG. 5 illustrates a device which is most useful as a control component for a fire alarm or other heat protection apparatus. At the core of this device is a sealed enclosure 115 containing a liquid in which a bubble 116 is suitably maintained to be displaced along a path defined by the inner conformation of the enclosure. Like the enclosure shown in FIGS. 1 and 4, enclosure 115 is made of thin glass tubing which in this particular instance is fashioned to form a spread V having arms 117 and 118 extending from an elbow portion 119. A hanger structure 120 fitted about the central portion of the enclosure supports it for angular disposition between open frames 140 of a yoke-like retainer 141. Comprising hanger 120 are fastening rings 121 and 122 which are fixed about the enclosure arms 117 and 118 respectively, and joined to form an integral structure by means of lateral connectors 123 extending along opposite sides of elbow 119 and between the rings. Pins or screws 143 are provided to pivotally attach the center portions of the connectors 123 within the retainer 141 by connections to the lower ends of the open frames 140. In addition, retainer 141 comprises a flange 142 from which depend the frames 140, and to which is secured a compartmented housing 143 for a number of electrical components. A bracket structure 165, comprising means to attaching the device to an existing surface 166, also includes means to facilitate the leveling and resetting of the device. Retainer 141 is pivotally connected to bracket 165, whose bearing sleeves 167 receive for rotation therein, support rods fixed to the opposite sides of housing 143. A reset spring 168 is connected between bracket 165 and a compartmented housing 150, to be hereinafter more fully described, fixed to the enclosure 115. A screw 169 adjustably retained in a threaded sleeve fixed to bracket 165, is in position to contact the upper surface of flange 142, whereby it limits the return action of spring 168 upon the enclosure and its supporting parts. An elongated bubble level 170 is fixed to this upper surface to aid in the resetting operation.

Provision is made to allow a fine adjustment of the enclosure's angular position relative to the horizontally leveled surface of flange 142. Extended outwardly from an upper portion of the hanger 120 and adjacent to the ring 121 thereof, is an elongated slot 124. Fixed to the end of a threaded rod 145 is a laterally disposed pin which fits through the slot 124, and provides by its displacement an effective camming action therein. In a collar 146 centrally attached by ordinary bracket means to an upper part of the retainer 141, is supported an internally threaded sleeve 147. Rod 145 passes up through this sleeve whereby its threads are engaged by the internal threads of the sleeve. A knob 148 fixed to the upper end of the sleeve permits a rotative adjustment thereof such that it drives the rod axially and consequently directs the rod's lateral pin to rotate, by its camming action, the hanger 120 about the pivot pins 143. As is clearly evident in the showing of FIG. 5, downward movement of the rod 145, tilts the arm 118 to a steeper angle relative to the horizontal, and upward movement of the rod will be effective to reposition arm 118 closer to a horizontal disposition.

A photocell detection system is used in connection with the embodiment of FIG. 5. Over an extended end portion of arm 117 of the enclosure 115, is fitted the housing 150 in whose partitioned sections are mounted a photocell 151, and a light source 152. Suitable openings in the partition walls of the housing that are contiguous to the cell and light, are effective to define a path for the light to pass through that part of the enclosure 115 between the cell and light. Appropriate electrical connections are provided between the pivotable housing 150 and fixed housing 143, by means of a flexible cable 155 extended between them. An outlet 156 in the housing 143 facilitates a connection to a conventional power source. A similar housing outlet 157 provides means to which a connection can be made joining the output of the device to an apparatus under its control.

When the device is used as a fire alarm control, it may be necessary to cover the greater part of the extended portion of enclosure arm 118 with a shroud 160 made of heat insulating material. This measure protects the far end of the enclosure from heat while allowing its elbow 119 to be exposed to any heat rising from below or coming from either side thereof. A thermal gradient is therefore set up between the middle and far end of the enclosure whereby bubble 116 will be drawn rapidly toward and into the elbow 119. Since enclosure ram 117 is preferably disposed at a relatively steeper angle than is arm 118, the bubble will thereafter quickly rise within arm 117 and lodge between the light 152 and the photocell 151. Since the liquid in the end of arm 117 which initially blocks or significantly diffuses the beam of light directed at cell 151, is thereby displaced by the transparent bubble, the photocell is sensitized and produces an output to the outlet 157. When it is desired to produce a control output upon detection of larger thermal gradients or greater temperature differences, the knob 148 is adjusted to tilt arm 118 upward, such that a thermal gradient of greater magnitude would be necessary to draw the bubble down into the elbow 119. Provision is made for fixedly mounting a temperature difference scale 162 within the frame 140, to cooperate with an indicating pointer 163 formed as an integral part of the hanger 120, and extending outwardly therefrom just above its pivotal connection. Angular adjustment of the enclosure will therefore also position the indicator 163 across the scale 162, the latter being suitably calibrated in accordance with the operational properties of the elements comprising the device. For use of the device at those higher temperatures which require arm 118 to be more steeply inclined from the horizontal than would be arm 117, it is convenient to further extend the insulating cover 160, and provide the housing 150 with a perforated or open top. As a result, the critical temperature difference can become equally effective on the end of arm 117 and elbow 119, whereby the thermal gradient between these points is diminished to zero. Enclosure 115 may also be given other shapes whereby arm 117 will remain at a steeper angle to the horizontal over the whole of the operational range of the device.

When the device is attached to a surface 166, as shown in FIG. 5, it is preset for operation by pivotally adjusting retainer 141, and the enclosure structure fixed thereto, about the bracket bearings 167, until the bubble in level 170 indicates that the pivoted parts are leveled. Stop 169 is thereafter adjusted to contact retainer flange 142 under the tension of spring 168, whereby the stop acts to maintain the leveling adjustment of the pivoted parts. Coincidently, the relative position of scale 162 can be verified by turning knob 148 such that indicator 163 is adjusted to point to a preset indicia S on an extension of scale 162, at which time the control bubble 116, which can be exposed to view by the removal of cover 160, to act as a level, should indicate that arm 117 is also leveled. A reset operation is simply accomplished by pivoting the retainer structure about bearings 167, against the tension of spring 168, to rotate the enclosure 115 counterclockwise as seen in FIG. 5, until its bubble 116 moves from the control position in arm 117, back through elbow 119, to a starting position in arm 118. Thereafter, the pivoted parts are released to the tension of spring 168, and a clockwise rotation to the predetermined position previously set by the adjustment of stop 169, whereby the device is once more ready for its usual operation.

The device of FIG. 5 is also applicable as a temperature differential detector. In this connection it can be mounted in an opening of a furnace wall to act as an overheat control therefor, or in a structural partition of a building to act as a control for a fire alarm, or similar safety control mechanism. When the device is used in this way, the end of enclosure arm 118 is located adjacent one surface of the wall, and the end of arm 117 is located adjacent another surface on the opposite side of the wall. Knob 148 may be adjusted beforehand to preset the control action to occur when a predetermined temperature differential exists between these opposing surfaces, instead of when a particular temperature is present as was indicated previously. The insulated cover 160 would ordinarily not be needed to shield arm 118, in this instance, although some form of insulation may be used on an enclosure portion to significantly increase the total temperature differential which could be specified to cause the full displacement of bubble 116.

Numerous different embodiments according to the invention are practical, and because of the number of parameters that can be predetermined and controlled for such other embodiments, they may be made operable at extreme temperatures in either narrow or broad ranges. For example, minute occlusions in exceedingly thin wall enclosures would permit thermal equilibration in a small fraction of a second at thermal gradients on the order of .001 degree per millimeter. Devices enclosing occulsions as described herein, when suitably installed and calibrated, would be particularly sensitive in a zero-gravity field, as found in free falling objects such as a ballistic missile, and in space vehicles.

Minute sealed-in-glass synthetic gas and liquid inclusions can be also adapted to make very minute sensors wherein a visual record of thermal gradients are preserved. Such sensors, which would be most valuable where communication connections are difficult, can be filled with a thermo-setting or chrono-setting fluid, such as certain organic resin monomers with polymerization catalysts such as peroxides, if necessary (e.g., styrene, methyl acrylate, etc.), and distributed over or through the object under test. The bubble positions in these sensors would be made permanent and available for later inspection by the setting of the fluid to a solid while the test object was undergoing the test conditions. Detection of the occlusion's displacement in an enclosure inaccessibly located, can also be accomplished by the use of radioactive gas such as radon, to fill the occlusion such that a radiation detector suitably situated in the vicinity of the enclosure will allow the initial and subsequent positions of the occlusion to be readily determined. Among the various other means adaptable to sense the bubble position are those made operable in accordance with the inherent differences between the properties of liquid and gas which are measured by techniques based on X-ray density, beta ray density, electrical conductivity, physical density, or magnetic susceptibility.

Further reasonable variations and modifications are possible within the scope of the foregoing disclosure and the appended claims to the invention.

What is claimed is:

1. A control mechanism made operatively responsive when placed in the path of a thermal gradient to relatively relocate composite constituents of the mechanism, said constituents comprising a liquid and a pocket of gas at least partially confined by said liquid, said mechanism comprising an enclosure enveloping said constituents and defining a conduit in which said pocket of gas is movable to displace said liquid, said enclosure having individual portions thereof disposed spaced apart thereon so as to lie along said path of a thermal gradient whereat said portions are operatively effective to sense degrees of sensible heat within separate areas along said path and transmit representative quantities of such heat into said composite constituents which heat passes therethrough from diverse directions with respect to said pocket of gas, means maintaining the relative position of said enclosure with respect to said path of a thermal gradient whereby said conduit defined therein is located at a predetermined angular disposition to a horizontal plane ranging from a straight to a right angle and guides displacement of said pocket of gas in a particular one of alternative directions through said conduit in accordance with the directional characteristics of the thermal gradient sensed between said separate areas, a means having indicia thereon representing directional characteristics of a thermal gradient, and a detecting means operatively responsive to a change in the relative disposition of said pocket of gas along said conduit defined by said enclosure to determine the operation of said indicating means, said detecting means comprising condenser components and further electrical components in a read-out circuit including current responsive elements and said indicating means, said condenser components constituting outer covering parts for said enclosure whereon they are arranged in a plurality of sets each of which comprises an equal number of said condenser components electrically insulated from one another and aligned to define a sector radiating from a common center, a charging circuit for said condenser components, and switch means operable to momentarily energize said charging circuit and to connect said circuit to said sets of condenser components, said read-out circuit including a set of said current responsive elements electrically connected to a set of said radially aligned condenser components, a multicontact selector switch connected between said sets of current responsive elements and indicating means, a selector contact arm of said selector switch being adjustably operable to connect in turn said individual sets of said current responsive means to said indicating means, whereby introduction of said gas pocket to displace liquid in said conduit defined by said enclosure being located between said condenser components produces a predetermined current in said read-out circuit which operates said indicating means to indicate the responsiveness of said circuit elements to said current as a measure of thermal gradient.

2. A control mechanism made operatively responsive when placed in the path of a thermal gradient to relatively relocate composite constituents of the mechanism, said constituents comprising a liquid and a pocket of gas at least partially confined by said liquid, said mechanism comprising an enclosure enveloping said constituents and defining a conduit in which said pocket of gas is movable to displace said liquid, said enclosure having individual portions thereof disposed spaced apart thereon so as to lie along said path of a thermal gradient whereat said portions are operatively effective to sense degrees of sensible heat within separate areas along said path and transmit representative quantities of such heat into said composite constituents, which heat passes therethrough from diverse directions with respect to said pocket of gas, and means maintaining the relative position of said enclosure with respect to said path of a thermal gradient, whereby the said conduit defined therein is located at a predetermined angular disposition to a horizontal plane ranging from a straight to a right angle and guides displacement of said pocket of gas in a particular one of alternative directions through said conduit in accordance with the directional characteristics of the thermal gradient sensed between said separate areas, said enclosure being an integral container further having first and second portions joined centrally, said means maintaining the relative position of said enclosure comprising a hanger attached to both said enclosure portions adjacent the said juncture, a frame, and means including said hanger for supporting said enclosure on one end of said frame for angular movement relative thereto, adjusting means fixed to said frame and connected to said hanger, operable to position said enclosure to selected angular dispositions, a housing fitted over and secured to said second enclosure portion, said housing having fixed therein a light source and a photocell arranged to allow a beam of light from said source to penetrate through said enclosure whereby it is received with effect on said photocell only when the gas pocket is within said second enclosure portion and between said light source and said photocell, bearing elements fixed to an end of said frame opposite to the said one end thereof, a further hanger, means including said bearing elements on said frame connecting said frame and its appertaining structure for pivotal movement relative to said further hanger, resilient means joining said housing to said further hanger, the latter having secured thereto a stop means operably adjustable to limit pivotal movement of said frame and the structure appertaining thereto produced in response to the action of said resilient means thereon, and leveling means operatively associated with said frame and the structure appertaining thereto, for indicating the adjustment required on said stop means to appropriately preset the said control mechanism to an operative condition.

3. A control mechanism made operatively responsive when placed in the path of a thermal gradient to relatively relocate composite constituents of the mechanism, said constituents comprising a liquid and a pocket of gas at least partially confined by said liquid, said mechanism comprising an enclosure enveloping said constituents and defining a conduit in which said pocket of gas is movable to displace said liquid, said enclosure having individual portions thereof disposed spaced apart thereon so as to lie along said path of a thermal gradient whereat said portions are operatively effective to sense degrees of sensible heat within separate areas along said path and transmit representative quantities of such heat into said composite constituents, which heat passes therethrough from diverse directions with respect to said pocket of gas, and means maintaining the relative position of said enclosure with respect to said path of a thermal gradient, whereby the said conduit defined therein is located at a predetermined angular disposition to a horizontal plane ranging from a straight to a right angle and guides displacement of said pocket of gas in a particular one of alternative directions through said conduit in accordance with the directional characteristics of the thermal gradient sensed between said separate areas, said enclosure being an integral container having first and second portions joined centrally and extending from the juncture at different angular dispositions to a horizontal plane, said means maintaining the relative position of said enclosure comprising a hanger element attached to both said enclosure portions adjacent their said juncture, a frame, and means including said hanger for supporting said enclosure for pivotal movement relative to said frame, adjusting means fixed to said frame and slidably connected to said hanger, operable to position said enclosure at selected angular dispositions, a compartmented housing fitted over and secured to said extended end of said second enclosure portion, respective compartments in said housing having fixed therein a light source and a photocell which are arranged to permit said source to direct a beam of light through said enclosure whereby it is received on said photocell only when the gas pocket is within said extended end of said second enclosure portion between said light source and photocell, a further housing at another end of said frame comprising electrical connector elements, and electrical circuits connecting the light source and photocell output to said electrical connector elements in said further housing.

4. The control mechanism of claim 3, further comprising a cap of heat insulation material enveloping the extended end of said first portion of said enclosure, a temperature scale fixed to said frame, and an indicator element displaceable with said hanger to scan across said scale to identify the temperature at which the gas pocket normally in said extended end of said first enclosure portion will be drawn toward said juncture and released to rise in said second enclosure portion to cause an output from said photocell.

5. An instrument for indicating and measuring thermal gradients comprising a sealed tubular enclosure of thin transparent material containing a liquid and a pocket of gas at least partially confined by said liquid, said enclosure having an arched central section each end of which converges smoothly with a separate upwardly and outwardly extending straight section relatively shorter than said central section.

6. The instrument of claim 5, further comprising a housing having a base including spaced apart heat conductive inserts, and a transparent top closure, wherein said enclosure is mounted to position lower portions thereof which are defined by said converging sections in said inserts of the base.

References Cited

UNITED STATES PATENTS

| 1,450,296 | 4/1923 | Lucas | 33—213 |
| 2,074,692 | 3/1937 | Granville | 33—205.4 |
| 2,206,033 | 6/1940 | Donnell | 33—212.2 |
| 2,252,727 | 8/1941 | Pepper | 33—206.5 |
| 2,936,411 | 5/1960 | Doty | 33—206.5 |
| 1,377,442 | 5/1921 | Sanford | 33—212 |
| 1,811,024 | 6/1931 | Potter | 73—339 |

LOUIS R. PRINCE, *Primary Examiner.*

D. McGIEHAN, S. C. SWISHER, *Assistant Examiners.*